Figure 1:
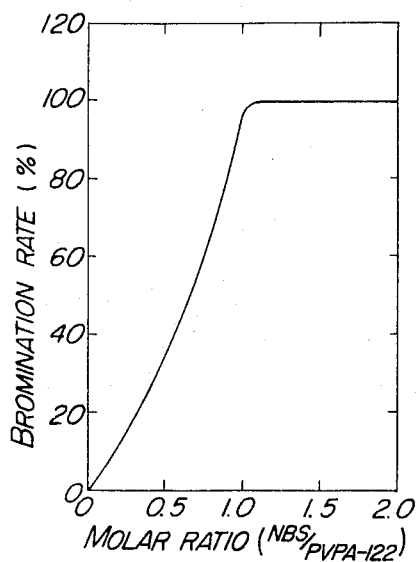

United States Patent [19]

Mukoh et al.

[11] 3,764,590

[45] Oct. 9, 1973

[54] ORGANIC PHOTOCONDUCTIVE MATERIALS

[75] Inventors: Akio Mukoh; Yasuki Mori; Kiyoshi Sakashita, all of Hitachi-shi; Sukekatsu Nozaki; Akira Hagitani, both of Tokyo, all of Japan

[73] Assignee: Hitachi, Ltd., Tokyo, Japan

[22] Filed: Apr. 6, 1971

[21] Appl. No.: 131,736

[30] Foreign Application Priority Data

Apr. 8, 1970 Japan.............................. 45/29339
Dec. 7, 1970 Japan............................ 45/107568
Dec. 7, 1970 Japan............................ 45/107569
Dec. 7, 1970 Japan............................ 45/107570

[52] U.S. Cl.............. 260/85.5 R, 96/1.5, 117/124, 117/128.4, 117/138.8, 117/155, 117/161, 260/30.4 R, 260/31.8 HR, 260/32.6 R, 260/33.6 UA, 260/33.8 UA, 260/85.5 B, 260/87.3, 260/88.1 P, 260/88.1 PA

[51] Int. Cl........................... C08f 7/02, C08f 19/00

[58] Field of Search................. 260/93.5 C, 88.1 P, 260/78.4 D, 85.5, 87.3

[56] References Cited

UNITED STATES PATENTS

| 3,162,532 | 12/1964 | Hoegl et al..................... 260/88.1 P |
| 3,361,726 | 1/1968 | Michel........................... 260/93.5 C |
| 3,464,819 | 9/1969 | Inami et al..................... 260/93.5 C |

*Primary Examiner*—Harry Wong, Jr.
*Attorney*—Craig, Antonelli & Hill

[57] ABSTRACT

A novel compound 9-(p-vinylphenyl)anthracene is prepared by the reaction of anthrone or 9-substituted anthracene with a p-substituted styrene. Polymers or copolymers of 9-(p-vinylphenyl)anthracene or brominated thereof show excellent photoconductivity.

17 Claims, 3 Drawing Figures

ORGANIC PHOTOCONDUCTIVE MATERIALS

This invention relates to 9-(p-vinylphenyl) anthracene, which is a polycyclic aromatic vinyl monomer represented by the formula I,

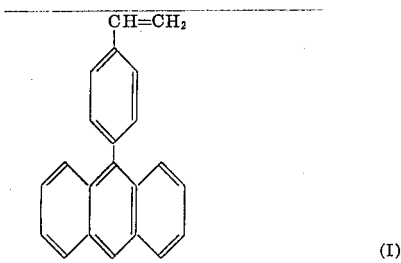

(I)

polymers of said vinyl monomer, and copolymers thereof with other vinyl monomers which are useful as organic photoconductive materials.

As materials having photoconductivity, there have heretofore been proposed inorganic materials such as selenium and zinc oxide; aromatic compounds such as anthracene and pyrene; low molecular weight heterocyclic compounds such as imidazole, oxazole, pyrazoline and derivatives thereof which are disclosed in Japanese Patent Publication Nos. 5,446/59, 5,467/59 and 8,560/59 filed by Kalle Co.; and organic polymers such as poly-N-vinylcarbazole and polyvinylnaphthalene. In addition thereto, many organic photoconductive materials have been known. Among these organic photoconductive materials, some can form transparent films but have such drawbacks that the photosensitivities thereof are one-several tenths to one-several hundredths of the sensitivities of said inorganic materials such as selenium and zinc oxide, while those which are excellent in photoconductivity are undesirably inferior in film-forming property and transparent property, which are characteristics of the organic materials. Thus, the actual state is such that the organic photoconductive materials of the prior art are difficultly put into practical use.

In view of such actual state as mentioned above, the present inventors made extensive studies, based on such a known knowledge that polycyclic aromatic compounds have properties as organic photoconductive materials, to find novel organic photoconductive compounds derived from the vinyl monomer represented by the formula I.

It is well known that polycyclic aromatic compounds have properties as organic semi-conductors, and various efforts have heretofore been made to produce such polycyclic aromatic vinyl polymers and to impart more excellent properties thereto. However, the efforts have been made with respect only to such polymers of 9-vinylanthracene (Japanese Patent Publication No. 2,629/68) and 3-vinylpyrene [Bull. Chem. Soc., Japan, 41, 2,719-2,722 (1968)].

An object of the present invention is to provide a novel polycyclic aromatic compound 9-(p-vinylphenyl)anthracene which is a starting material for producing a novel photoconductive material.

Another object of the present invention is to provide a novel photoconductive polymer synthesized from the above novel compound which has a high photoconductivity, an excellent film forming property, and a good transparency.

Still another object of the present invention is to provide a novel copolymer synthesized from the above novel polycyclic aromatic compound and a polymerizable vinyl monomer, which copolymer has an improved film forming property and photoconductivity.

Still another object of the present invention is to provide a novel photoconductive composition including a suitable plasticizer.

Still further object of the present invention is to provide processes for producing the novel compound and a polymer and copolymer derived from the compound.

According to the present invention, 9-(p-vinylphenyl)anthracene is obtained by reacting a 9-substituted anthracene (e.g. 9-bromoanthracene or 9-lithium anthracene) or anthrone with p-substituted styrene, as represented by the following reaction scheme (II or III):

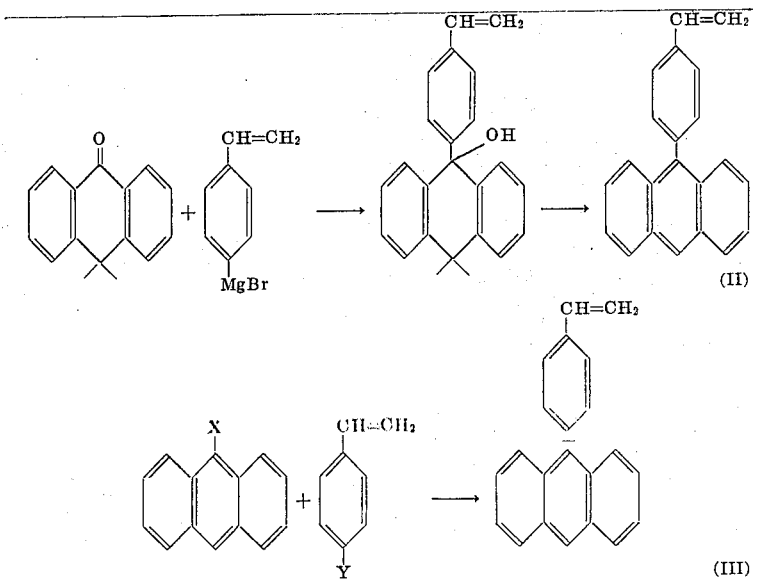

X, Y; MgBr, MgI, Br, I, Li

Note: in case that X is Li or halogenated Mg, Y is halogen and that X is halogen, Y is Li or halogenated Mg.

A process for the synthesis of p-bromostyrene which is one of the reactants in the above reaction, is disclosed in the literature materials "Organic Reaction", II, 198 (1944) and "Organic Synthesis", III, 204 (1955).

According to the above literatures, 24 g. of commercially available p-bromoacetophenone is dissolved in a mixed solution comprising 26.6 g. of aluminum isopropylate and 130 ml. of dehydrated isopropyl alcohol, and the resulting solution is continuously boiled until the distillation of acetone had ceased. Subsequently, the reaction solution is cooled and hydrolyzed with a hydrochloric acid solution containing ice, and then the organic layer was extracted with benzene and dried with anhydrous sodium sulfate. Thereafter, the solvent benzene is removed, and the residue is subjected to reduced pressure distillation at 85° – 87°C/1 mmHg, whereby 20.2 g. of p-bromo-(α-hydroxyethyl) benzene is obtained, yield 83.3 percent. Subsequently, 20.2 g. of the above-mentioned alcohol is mixed with a small amount of tert-butyl catechol as a stabilizer and dropped on 1.35 g. of molten $KHSO_4$ kept at 220° – 230°C/123 – 128 mmHg, and the fractions are collected and diluted with ether. Thereafter, the water layer is removed, and the organic layer is dried with magnesium sulfate, freed from the solvent and then subjected to reduced pressure distillation (85° – 85.5°C/11 mmHg) to obtain 13.3 g. of p-bromostyrene, yield 72.7 percent.

The present invention will be apparent from the following examples.

Example 1

A mixture comprising 49 g. of metal magnesium and 50 ml. of dry tetrahydrofuran (solvent) was added to a Grignard reaction flask. Into the mixture was dropped with mild refluxing 36.6 g. of the p-bromostyrene which had been diluted to about 4 times by means of tetrahydrofuran. After the magnesium had disappeared, a solution of 38.8 g. of anthrone in 600 ml. of tetrahydrofuran was dropped into the above-mentioned Grignard solution with stirring. (The dropping is preferably effected in a dry nitrogen atmosphere.) The resulting mixed solution was refluxed for 5 hours, cooled and then hydrolyzed with hydrochloric acid solution containing ice, and the organic layer was extracted with diethyl ether (hereinafter referred to as ether), dried with sodium sulfate and then freed from the solvent (ether), whereby 65 g. of a yellow semi-solid residue was obtained. Subsequently, phosphorous pentoxide (dehydrating agent) in substantially the same amount as that of the residue was added to a benzene solution of the yellow semi-solid residue, and the resulting mixture was stirred at room temperature, decanted, washed with water, dried and then purified by means of silica gel column-chromatography to obtain 22.5 g. of the desired 9-(p-vinylphenyl)anthracene.

This product was in the form of yellowish white plate-like crystals having a melting point of 166° to 168°C. and emitted a strong blue fluorescence when irradiated with ultraviolet rays. Further, the infrared absorption spectrum of the product showed at 909 $cm^{-1}$ and 990 $cm^{-1}$ the same absorptions as those of double bonds observed in styrene.

The elementary analysis values of the thus obtained product were C: 94.26 percent and H: 5.56 percent, and well coincided with the calculated values for $C_{22}H_{16}$; C: 94.25 percent and H: 5.75 percent.

Example 2

To the same solution of Grignard reagent of p-bromostyrene as in Example 1 was added 1/200 mole per mole of said reagent of cobalt chloride as a catalyst. Into this solution was dropped with stirring in a nitrogen atmosphere a tetrahydrofuran solution of 9-bromoanthracene in an amount equimolar to the Grignard reagent. The resulting mixed solution was refluxed for 3 hours, cooled and then hydrolyzed with hydrochloric acid solution containing ice, and the organic layer was extracted with ether, dried with sodium sulfate and freed from the solvent, whereby yellowish white crystals were obtained. These crystals were purified by means of alumina column chromatography to obtain 9-(p-vinylphenyl)-anthracene, yield 37.0 percent. The elementary analysis values of this product coincided with those of the product obtained in Example 1.

Examle 3

To an ether solution of 1 mole of butyl bromide was added 2.5 moles of metallic lithium to form an ether solution of butyl lithium. This solution was mixed in a dry nitrogen atmosphere with an ether solution of 0.7 mole of 9-bromoanthracene to obtain an ether solution of 9-lithium anthracene. Into this ether solution was dropped with stirring in a nitrogen atmosphere in the presence of a cobalt chloride catalyst an ether solution of 1.4 moles of p-iodostyrene. The mixed solution was refluxed for 5 hours and then subjected to the same after-treatment as in Example 2 to obtain 9-(p-vinylphenyl)anthracene, yield 35.4 percent. The elementary analysis values of this product coincided with those of the product obtained in Example 1.

As the solvent, not only ether but also tetrahydrofuran, petroleum ether or benzene, hexane, heptane etc., may be used.

In the following, there are disclosed polymers preferable as organic photoconductive materials and a process for producing such polymers by polymerizing 9-(p-vinylphenyl)anthracene synthesized according to such procedures as mentioned above, or by copolymerizing the same with other vinyl monomers such as styrene, acrylonitrile, N-vinylcarbazole, etc. These polymers can be obtained according to any of radical polymerization or ionic polymerization.

The radical polymerization is carried out, in general, in the presence of a polymerization initiator. Typical examples of the polymerization initiator are peroxides such as benzoyl peroxide, lauroyl peroxide and di-tert-butyl peroxide, azobisisobutyronitrile, potassium persulfate and ammonium persulfate, and a combination of cumene hydroperoxide with ferrous ion. These may be used either singly or in the form of a mixture of two or more. The polymerization reaction is effected at 60° to 200°C. for 2 to 40 hours, whereby the desired product is obtained. In addition thereto, the radical polymerization reaction may be carried out according to thermal polymerization or radiation-induced polymerization.

The ionic polymerization is carried out in the presence of a Ziegler type catalyst. As the Ziegler type catalysts, there may be shown, for example, catalyst systems composed of alkylaluminums such as triethylaluminum, trimethylaluminum and diethylaluminum, or alkylaluminum halides, and titanium trichloride, titanium tetrachloride and many other vanadium type compounds, and those which are called as Ziegler type catalysts, in general, may be used. The reaction is effected in a closed system at 30° to 250°C. for 10 to 100 hours in the presence of one or two or more of the above-mentioned catalysts, whereby the desired product can be obtained. Alternatively, the polymerization may be carried out according to cationic polymerization using as a catalyst an electron attractive compound such as boron trifluoride or aluminum chloride, or according to anionic polymerization using as a catalyst an organometallic compound such as sodium salt of anthracene.

Polymers obtained according to the above-mentioned polymerization processes display excellent photoconductivity, and hence are widely applicable to organic semi-conductors, photosensitive electrophotographic materials and microfilms and, by utilization of the fluorescence thereof, to scintillation counter materials.

Procedures for practice of the radical polymerization are set forth below with reference to examples.

Example 4

0.3 Gram of 9-(p-vinylphenyl)anthracene was added to a polymerization tube. To the tube was then added 0.2 ml. of a xylene solution of 1 mg. of di-tert-butyl peroxide as a radical polymerization initiator. After replacing the air with nitrogen gas, the tube was sealed under reduced pressure and then heated at 130°C. for 12 hours. Thereafter, the polymer produced was dissolved in 50 ml. of toluene and then precipitated by addition of ethanol. The precipitate was recovered by filtration, dried and then redissolved in toluene and subsequently reprecipitated with ethanol. Subsequently, the reprecipitate was recovered by filtration and dried to obtain a yellow powdery polymer emitting a fluorescence which had a maximum wave length at 447 m$\mu$.

The polymerization conversion in the above-mentioned polymerization reaction was 89 percent. From this value, and from the conversion per unit time (second) at the initial polymerization ($8.3 \times 10^{-3}$ %/sec.), it was recognized that the 9-(p-vinylphenyl)anthracene can be far more easily radical-polymerized than the conventional polycyclic aromatic monomer 1-(or 9-) vinylanthracene or 3-vinylpyrene.

Thus, the 9-(p-vinylphenyl)anthracene is quite easily polymerizable, and hence can be copolymerized with other vinyl monomers such as, for example, styrene, acrylonitrile, N-vinyl carbazole and vinyl acetate.

Procedures for the copolymerization of 9-(p-vinylphenyl)anthracene with styrene or N-vinylcarbazole are set forth below with reference to Examples 5 and 6.

Example 5

To a solution of 2 g. of 9-(p-vinylphenyl)-anthracene and 0.5 g. of styrene in 50 ml. of chlorobenzene was added 0.5 mg. of di-tert-butyl peroxide, and was polymerized at 110°C. for 15 hours. The polymerization product was poured into ethanol, whereby a pale yellow precipitate was deposited. This precipitate was recovered by filtration, dried, redissolved in chlorobenzene and then reprecipitated with ethanol to obtain 2.05 g. of a yellow powdery polymer, yield 82.0 percent.

Example 6

A mixture comprising 6.9 g. ($2.46 \times 10^{-2}$ mole) of 9-(p-vinylphenyl)anthracene and 3.1 g. ($1.60 \times 10^{-2}$ mole) of N-vinylcarbazole was added to a polymerization tube, and the air in the tube was removed and substituted with nitrogen gas. To the tube was added 2 ml. of a xylene solution containing 5 mg. of di-tert-butyl peroxide. Thereafter, the air in the tube was again removed at the liquid nitrogen temperature, and the tube was sealed and then heated at 130°C. for 15 hours. Subsequently, the tube was opened, and the polymerization product was dissolved in 100 ml. of benzene and then poured into 1 liter of methanol to deposit a precipitate. This precipitate was recovered by filtration and then dried. The dried precipitate was again dissolved in benzene and reprecipitated with methanol, whereby a yellowish white polymer soluble in benzene, dichloromethane and tetrahydrofuran was obtained substantially quantitatively.

When the infrared absorption spectrum of the thus obtained polymer was examined, characteristic absorptions inherent to the carbazole nucleus were observed at 720 cm$^{-1}$ and 748 cm$^{-1}$, a characteristic absorption inherent to the nucleus of 9-phenylanthracene was observed at 730 cm$^{-1}$, and thus it was understood that carbazole and 9-phenylanthracene nuclei were present in the polymer.

In the next place, procedures for practice of the ionic polymerization by use of Ziegler type catalysts are set forth below with reference to Examples 7 and 8.

Example 7

To a mixture of 10 g. of 9-(p-vinylphenyl)-anthracene and 10 ml. of benzene was added as a Ziegler catalyst a complex of 1.7 ml. of triethylaluminum with 105 mg. of titanium trichloride which had been aged at 60°C. for 1 hour in 7 ml. of n-hexane. The resulting mixture was added to a polymerization tube, which had been substituted with nitrogen gas. After sealing the tube, the mixture was polymerized at 80°C. for 45 hours and then refluxed for 1 hour together with 50 ml. of benzene and 50 ml. of n-propyl alcohol. The reaction mixture was added in 100 ml. of methanol and 100 ml. of 1N-hydrochloric acid and refluxed for 2 hours, and then the lower layer of the liquid was removed. The residue was again added in 100 ml. of methanol and 100 ml. of 1N-hydrochloric acid and refluxed for 2 hours, and then the lower layer thereof was removed. Subsequently, the benzene-insoluble polymerization product was separated by filtration from the residue sufficiently washed with benzene, concentrated to a suitable amount and then poured into methanol, whereby a pale yellow benzene-soluble polymer was obtained. For purification, this polymer was dissolved in benzene and reprecipitated with ethanol. This treatment was carried out 2 times to obtain the desired polymer of 9-(p-vinylphenyl)-anthracene emitting a yellowish green fluorescence, yield 65 percent. On the other hand, the above-mentioned benzene-insoluble polymerization product was dried after separation from the benzene-soluble polymer, whereby a benzene-insoluble yellow polymer was obtained, though the yield thereof varied in the range of 10 to 60 percent depending on the polymerization conditions.

Example 8

To a mixture of 10 g. of 9-(p-vinylphenyl)-anthracene and 15 ml. of benzene was added as a Ziegler catalyst a complex of 0.85 ml. of triethylaluminum and 97.5 mg. of titanium tetrachloride which had been aged at 60°C. for 1 hour in 15 ml. of n-hexane. The resulting mixture was reacted at 60°C. for 60 hours, and then treated in the same manner as in Example 7 to obtain the desired polymer in a yield of 50 percent.

In the Ziegler type catalysts used in Examples 7 and 8, the triethylaluminum may be replaced by trimethylaluminum, diethylaluminum chloride or the like alkylaluminum or alkylaluminum halide, and the titanium trichloride or titanium tetrachloride may be replaced by any one of many vanadium type catalysts. In the present invention, there may be used any catalysts which are called as Ziegler type catalysts, in general.

According to infrared analysis, it was confirmed that the products obtained in the above-mentioned examples were such polymers that have no characteristic absorptions due to vinyl groups at 906 cm$^{-1}$, 995 cm$^{-1}$ and 1395 cm$^{-1}$, which are seen in the 9-(p-vinylphenyl)-anthracene monomer. Further, the molecular weight of each of the thus obtained 9-(p-vinylphenyl)anthracene polymers was in the range of 2,000 to 150,000 and thus varied depending on the polymerization conditions, and the melting point thereof was in the range of 220° to 450°C.

The benzene-soluble polymer according to the present invention is soluble in many benzene type solvents, and may be dissolved in tetrahydrofuran, dioxane, dichloromethane or dimethylformamide to give a film excellent in transparency.

On the other hand, the benzene-insoluble polymer can form a film excellent in photoconductivity when used in combination with a binder such as phenol resin, vinyl chloride polymer or copolymer, polyvinyl acetate, polystyrene, polyacrylate, silicone resin, polycarbonate or butyral resin. That is, the benzene-insoluble polymer is finely ground by means of a mortar or ball mill and then dispersed in the binder. In addition to the above-mentioned binders, there may be used polyterpene, or acetal resin, a copolymer containing said units, or a modified polymer containing rubber or the like.

In order to further increase the photoconductivity of the above-mentioned polymers of 9-(p-vinylphenyl)anthracene and copolymers thereof with other vinyl monomers, it is desirable to incorporate sensitizers therein. As the sensitizers, there are preferably incorporated 1 to 80 percent by wight of nitroanthraquinone, chloroaniline, tetracyanoethylene, tetracyanoquinodimethane, phthalic anhydride, trichloroacetic acid or ordinary Lewis acid, and 0.1 to 10 percent by weight of a dye sensitizer such as Crystal Violet, Malachite Green, Rhodamine B, Auramine or Nile Blue.

In practical application of the polymer of the present invention, the polymer itself may be used in the form of a film or sheet. Alternatively, the polymer may be coated on a support, e.g. a metal plate such as aluminum plate, or an insulating plate or sheet having a conductive layer such as NESA film. In addition thereto, there may be used a glass plate, a plastic film or a surface-treated paper. In this case, the polymer of the present invention is dissolved or dispersed in a solvent, and the resulting solution or dispersion is incorporated with suitable additive and binder, uniformly coated on the surface of the support and then dried, whereby a photoconductive film can be obtained.

A polymer of the present invention was compare in photosensitivity with commercially available organic photoconductive materials. The photosensitivity was represented by the so-called half-decay (unit: lux second) which was observed in the case where the charge on the film surface decreased to one-half of the initial value when irradiated with a tungsten lamp. The results obtained were as set forth in Table 1.

TABLE 1

| Photoconductive material | | Sensitizer | | Half-decay (lux second) |
|---|---|---|---|---|
| Anthracene | 0.1 g | Chloranil | 0.01 g | 750 |
| 9-Phenylanthracene | 0.1 g | TCNQ* | 0.01 g | 3,800 |
| Poly-N-vinylcarbazole** | | Incorporated** | | 120 |
| 1,3,5-Triphenylpyrazoline*** | | do.*** | | 1,000 |
| 9-(p-vinylphenyl)anthracene polymer | | TCNQ | | 80 |

\* TCNQ: Tetracyanoquinodimethane
\*\* data disclosed in Japanese Patent Publication No. 27588/68
\*\*\* data disclosed in Japanese Patent Publication No. 11547/59

As is clear from Table 1, it is understood that the polymer of the present invention is more excellent in photosensitivity than the known organic photoconductive materials.

The 9-(p-vinylphenyl)anthracene polymers of the present invention can be enhanced in photosensitivity by brominating the polymers.

Procedures for brominating the 9-(p-vinylphenyl)anthracene polymers are illustrated below with reference to examples.

Example 9

To a solution of 5 g. of a 9-(p-vinylphenyl)-anthracene polymer having a molecular weight of 20,100 in 50 ml. of benzene were added 6.4 g. of N-bromosuccinimide and 86 mg. of benzoyl peroxide, and the resulting mixture was refluxed with stirring for 3 hours. The reaction mixture was added to methanol to obtain 6.6 g. of a yellowish white polymer as a precipitate. This polymer was purified by dissolving in tetrahydrofuran and again adding into methanol. The bromination rate of the thus treated polymer was 98.5 percent as calculated from the elementary analysis value of bromine 21.92 percent, assuming as 100 percent the bromination rate in the case where one bromine atom was substituted in the structural unit of the polymer, and the bromination rate of the brominated polymer was substantially same as that of a polymer of a mono-brominated compound.

Example 10

To a solution of 5 g. of a 9-(p-vinylphenyl)-anthracene polymer in 50 ml. of benzene were added 1.6 g. of N-bromosuccinimide and 22 mg. of benzoyl peroxide, and the resulting mixture was refluxed with stirring for 3 hours. The reaction mixture was purified in the same manner as in Example 9. The bromination rate of the thus treated polymer was 35.2 percent as calculated from the elementary analysis value of bromine 7.88 percent, and thus one bromine atom had substituted per 3 structural units.

In the above-mentioned reaction, in case one structural unit of the 9-(p-vinylphenyl)anthracene polymer is assumed as 1 mole, not more than one bromine is substituted in the structural unit even when the molar ratio of the N-bromosuccinimide thereto is varied to more than one. This is clear from the fact that when, as seen in FIG. 1, the molar ratio of the N-bromosuccinimide (abbreviated to "NBS") to one structural unit of the 9-(p-vinylphenyl)anthracene polymer (abbreviated to "PVPA-122") is plotted on the horizontal axis and the bromination rate of the polymer is plotted on the vertical axis, the bromination rate increases with increasing molar ratio but does not become more than 100 percent even if the molar ratio is increased to more than about 1.0. That is to say, this is considered ascribable to the fact that the bromine is substituted in the 10-position of the 9-phenylanthracene nucleus in the polymer, as shown by the following equation:

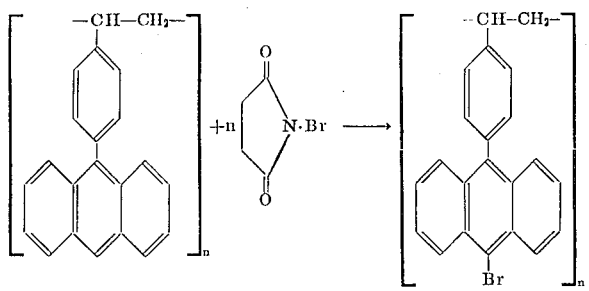

It should be noted that the actual structure of the polymer is not necessarily limited to the above molecular structure.

The thus obtained brominated 9-(p-vinylphenyl)anthracene polymer is soluble in benzene, tetrahydrofuran, dioxane, N,N'-dimethylformamide and dichloromethane. When a solution of the polymer in any of the said solvents is applied onto a support by flowing, roll-coating or spraying, a yellow transparent film can be prepared.

In order to further sensitize such brominated 9-(p-vinylphenyl)anthracene polymers, it is desirable to incorporate therein the previously mentioned sensitizers.

A brominated 9-(p-vinylphenyl)anthracene polymer of the present invention was compared in photosensitivity with conventional and commercially available photoconductive materials. The photosensitivity was represented by the so-called half-decay as mentioned previously. The results obtained were as set forth in Table 2.

TABLE 2

| Photoconductive material | Sensitizer | Half-decay (lux second) |
| --- | --- | --- |
| 9-Phenylanthracene | Incorporated | 3,800* |
| 9-(p-Vinylphenyl)anthracene polymer | do. | 80* |
| Brominated 9-(p-vinylphenyl) anthracene polymer | do. | 40 |
| Poly-N-vinylcarbazole | do. | 120* |

* see Table 1

From the above results, it is understood that the brominated polymer shows one-half of the half-decay of the unbrominated polymer and one-third of the said value of the commercially available product, and thus is markedly excellent in photosensitivity.

As mentioned above, the present inventors examined the photoconductivities of the aforesaid polymers of 9-(p-vinylphenyl)anthracene and copolymers thereof with other vinyl monomers, e.g. styrene, acrylonitrile, N-vinylcarbazole, vinyl acetate, etc., and the bromination products of said polymers, to find that these polymers are excellent photoconductive polymers which have not been proposed hitherto.

Most of these polymers can form transparent films. However, when the polymers are independently formed into films, there are some cases where the films are brittle and not sufficient in elongation. For example, when the polymers are impregnated into electrophotographic papers and the like fibrous materials, no problem arises, but when applied onto the smooth surfaces of plastic sheets or glass plates, the films formed from the polymers are low in adhesion thereto and, due to vaporization of the solvents, the resulting films are shrunk to bring about such drawbacks that they are distorted, cracked or peeled off. In order to overcome such drawbacks, there may thought of such procedures as the use of said polymers in combination with other resins or the addition of commercially available plasticizers such as polyphenyl chloride, dioctyl phthalate, dioctyl adipate, etc. However, most of these procedures tend to accelerate the attenuation or decay of charged potential in the dark (dark resistance), to greatly lower the photosensitivity, or damage the transparency.

In order to solve the above problems, an organic photoconductive material is provided in accordance with the present invention. That is, there is provided an organic photoconductive material by incorporating a terphenyl into at least one organic photoconductive material selected from the group consisting of 9-(p-vinylphenyl)anthracene polymers, copolymers of 9-(p-vinylphenyl)anthracene, bromination products of said polymers or copolymers and combinations thereof. The amount of the terphenyl is 10 to 90 parts per 100 parts of the polymer. In this case, any of the solvents for the aforesaid polymers, such as benzene, tetrahydrofuran, dioxane, dichloromethane or dimethylformamide may be used as it is, and any of the sensitizers for the aforesaid polymers may be used as it is. The thus prepared brominated polymer solution is applied onto a support by flowing or roll-coating method and then dried to form a film. The film thus formed is transparent and highly elastic, and is not cracked nor peeled off.

The fact that terphenyls are excellent plasticizers which do not injure the photoconductivity of the aforesaid polymers is set forth below with reference to examples.

Example 11

Figure 2:
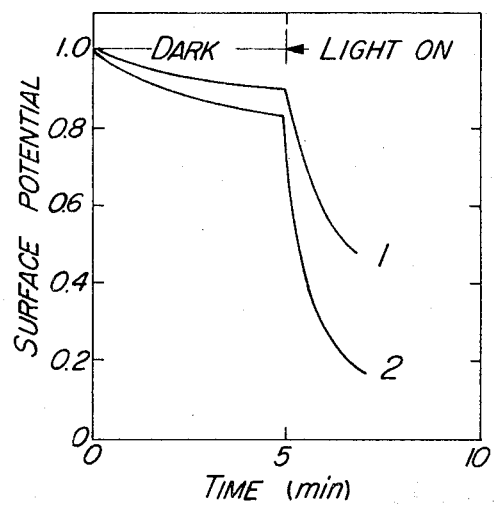

In this example, a film of 9-(p-ethylphenyl) anthracene (hereinafter abbreviated to "EPA"), which can be regarded as a compound similar in structural unit to the 9-(p-vinylphenyl)anthracene polymer, was formed using polystyrene as a binder, and the effect of addition of terphenyl was examined by comparing the surface potential of the film prepared from a mixture comprising 100 parts of EPA and 100 parts of polystyrene with that of a film prepared from the said mixture which had additionally been incorporated with 50 parts of m-terphenyl. The results obtained were as shown in FIG. 2, in which the curve 1 represents the surface potential of the former film, and the curve 2 represents that of the latter film.

The test was carried out in such a manner as set forth below.

Each of the above-mentioned mixtures was dissolved in toluene, and the resulting solution was flowed on an aluminum plate to form a film of 4 μ in thickness. This film was positively charged by application of 5 KV-corona discharge according to an ordinary procedure, and then the surface potential of the film with lapse of time in the dark was compared with that of the case where a light was irradiated to the film after lapse of a definite period of time. As the result, the surface potential did not substantially vary during the case where the film after electrification was allowed to stand for 5 minutes in the dark, but when a light was irradiated to the film after lapse of 5 minutes, the potential rapidly lowered due to the photoconductivity of the film. In FIG. 2, the curve 1 shows the case where a light of 500 luxes was irradiated, and the curve 2 shows the case where a light of 50 luxes was irradiated. As is clear from FIG. 2, it is understood that even when a 1/10 lux-light was appied, the film incorporated with m-terphenyl was greater in surface potential than the film incorporated with no m-terphenyl. This substantiates the fact that m-terphenyl is an excellent plasticizer which does not injure the photoconductivity of 9-(p-vinylphenyl)anthracene polymer.

Example 12

The case where 9-(p-vinylphenyl)anthracene polymer (hereinafter abbreviated to "PVPA") was used in admixture with polystyrene, the case where PVPA was used in admixture with each of polyphenyl chloride and dioctyl phthalate as commercially available plasticizers, and the case where PVPA was used in admixture with each of m- and o-terphenyls, were compared each other. Each of the said mixtures was dissolved in benzene, and the resulting solution was flowed on an aluminum plate to form a film of about 5 $\mu$ in thickness. The state of each film in this case was as set forth in Table 3, in which is also shown the photosensitivity of the film in terms of the previously mentioned half-decay.

TABLE 3

| PVPA | Additive | | State of film | Half-decay (lux second) |
|---|---|---|---|---|
| 1 g. | Polystyrene | 1 g. | Turbid | 50,000 |
| Do. | Polyphenyl chloride | 0.5 g. | Transparent | 33,000 |
| Do. | Dioctyl phthalate | 0.5 g. | Turbid | 50,000 |
| Do. | m-Terphenyl | 0.5 g. | Transparent | 1,000 |
| Do. | o-Terphenyl | 0.5 g. | do. | 1,500 |

The results set forth in Table 3 obviously show that PVPA incorporated with terphenyl can give an elastic and transparent film which is less in half-decay and excellent in photoconductivity.

Example 13

50 Parts of m-terphenyl was added to 100 parts of each of PVPA, a copolymer thereof with styrene (PVPA-PS) and brominated PVPA (PVPA-Br). The resulting mixtures were treated in the same manner as in Example 12 to prepare films. These films were individually irradiated with a 50 lux-light by use of a tungsten lamp, and were compared in surface potential. The results obtained were as shown in FIG. 3, in which the curve 3 shows the case where PVPA was used solely, and the curves 4, 5 and 6 show, respectively, the cases where PVPA, PVPA-PS and PVPA-Br were individually used in admixture with m-terphenyl.

Figure 3:
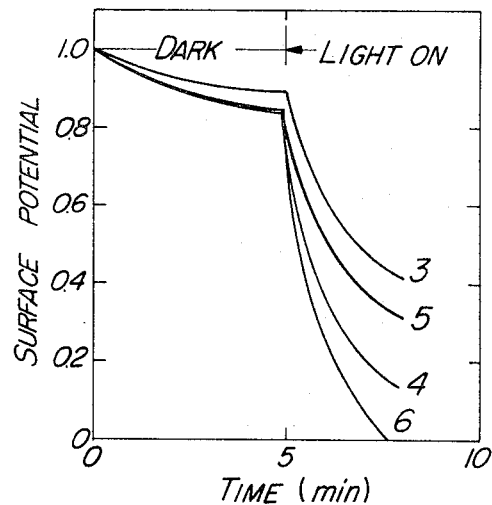

As is clear from FIG. 3, the films were improved in photoconductivity by addition of m-terphenyl. Further, these films were excellent in transparency.

The above-mentioned polymers may be used either singly or in the form of a mixture of two or more.

In order to illustrate the present invention more concretely, the applications of the organic photoconductive materials of the present invention to electrophotography materials are set forth below with reference to application examples. Although the photoconductive material according to the present invention can be charged both positively and negatively, the following Application Examples are described in connection with the cases of positive charge.

Application Example 1

5 Grams of the 9-(p-vinylphenyl)anthracene polymer obtained in Example 3 was dispersed in a solution of 5 g. of polystyrene in 10 ml. of benzene. This dispersion was flow-coated on an aluminum plate and then dried to form a film of 10 $\mu$ in thickness. The thus formed film was charged by application of 3 KV-corona discharge, and exposed for 10 seconds through a positive original to a 1,000 lux-light. Subsequently, a developing toner was sprinkled over the exposed film to obtain an image faithful to the original.

Application Example 2

5 Grams of the polymer obtained in Example 3 was dispersed in 10 ml. of a benzene solution containing 1 g. of m-terphenyl, 0.5 g. of nitroanthraquinone and 25 mg. of Malachite Green. This dispersion was treated in the same manner as in Application Example 1 to form a film. The thus formed film was charged according to an ordinary procedure and then exposed for 5 seconds through a positive original to a 1,000 lux-light. Subsequently, a developing toner was sprinkled over the exposed film to obtain an image faithful to the original, which image was then fixed by heating at 50°C.

Application Example 3

5 Grams of the 9-(p-vinylphenyl)anthracene-N-vinylcarbazole copolymer obtained in Example 6 was dissolved together with 1 g. of nitroanthraquinone in 10 ml. of benzene. The resulting solution was sufficiently mixed with 1 g. of diphenyl chloride and 0.05 g. of Crystal Violet. Subsequently, the solution was coated by roll-coating on a copper plate and then dried to form a film of 15 $\mu$ in thickness. The thus formed film was charged according to an ordinary procedure, and then exposed for 10 seconds through a positive original to a 100 lux-light. Thereafter, a developing toner was sprinkled over the exposed film to obtain an image faithful to the original which image was then fixed by heating at 50°C.

Application Example 4

1 Gram of the polymer (molecular weight 4,500) obtained in Example 7, 0.4 g. of m-terphenyl and 0.1 g. of chloroaniline were dissolved in benzene. The resulting solution was coated on a aluminum plate to form a transparent film of 4 $\mu$ in thickness. The thus formed film was charged according to an ordinary procedure, and then exposed for 2 seconds through a positive original to a 700 lux-light. Subsequently, a developing toner was sprinkled over the exposed film to obtain an image faithful to the original which image was then fixed by heating at 40°C.

Application Example 5

1 Gram of a polymer (molecular weight 15,000) obtained in the same manner as in Example 8, 0.5 g. of m-terphenyl, 1 mg. of Crystal Violet and 100 mg. of tetracyanoethylene were dissolved in tetrahydrofuran. The resulting solution was coated on a glass plate having a NESA film to form a photosensitive layer of 3 $\mu$ in thickness. The thus formed layer was charged according to an ordinary procedure, and then exposed for 1 second through a positive original to a 1,000 lux-light. Subsequently, a developing toner was sprinkled over the exposed layer to obtain an image faithful to the original.

Application Example 6

3 Grams of a benzene-insoluble 9-(p-vinylphenyl)anthracene polymer obtained in the same manner as in Example 8 and 0.6 g. of polycarbonate were sufficiently mixed and dispersed in benzene. The resulting dispersion was coated by roll-coating on an aluminum plate and then dried to form a film of 3 μ in thickness. The thus formed film was charged according to an ordinary procedure and then exposed for 1 second through a positive original to a 50 lux-light. Subsequently, a developing toner was sprinkled over the exposed film to obtain an image faithful to the original which image was then fixed by heating at 40°C.

Application Example 7

3 Grams of a benzene-insoluble polymer obtained in the same manner as in Example 8, 4 g. of terpene resin, 300 mg. of nitroanthraquinone and 30 mg. of Crystal Violet were sufficiently mixed and dispersed in benzene. The resulting dispersion was flow-coated on a surface-treated paper to form a film of 2 μ in thickness. The thus formed film was charged according to an ordinary procedure, and then an original was projected onto the film for 1 second according to reflection method. In this case, the illuminance on the paper surface was so controlled as to become 20 luxes. Subsequently, a developing toner was sprinkled over the film to obtain an image faithful to the original.

Application Example 8

3 Grams of the brominated 9-(p-vinylphenyl) anthracene polymer obtained in Example 9 and 0.6 g. of m-terphenyl as a plasticizer were dissolved in tetrahydrofuran. The resulting solution was flow-coated on an aluminum plate and then allowed to dry to form a yellow transparent film of about 5 μ in thickness. The thus formed film was positively charged by application of 3 KV-corona discharge, and then exposed for 2 seconds through a positive original to a light giving an illuminance of 700 luxes on the film surface. Subsequently, a developing toner was sprinkled over the exposed film to obtain an image faithful to the original which image was then fixed by strong heating at 80°C.

Application Example 9

5 Grams of the brominated 9-(p-vinylphenyl) anthracene polymer obtained in Example 10, 0.2 g. of m-terphenyl as a plasticizer and 0.5 g. of chloranil as a sensitizer were dissolved in benzene. The resulting solution was roll-coated on a glass plate having a NESA film and then allowed to dry to form a transparent film of about 3 μ in thickness. The thus formed film was positively charged according to an ordinary procedure, and then exposed for 1 second through a positive original to a light giving an illuminance of 1,000 luxes on the film surface. Subsequently, a developing toner was sprinkled over the exposed film to obtain an image faithful to the original which image was then fixed by heating at 50°C.

What we claim is:

1. A novel polymer for use in a photoconductive material which is a homopolymer of 9-(p-vinylphenyl)anthracene having 9-phenyl anthracene in the molecule represented by the following structure:

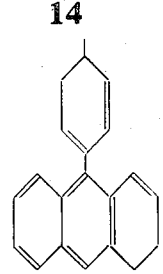

2. A novel copolymer for use in a photoconductive material which is synthesized by copolymerizing a substantial amount of 9-(p-vinylphenyl) anthracene and another polymerizable vinyl monomer, said copolymer containing the following structure in its molecule:

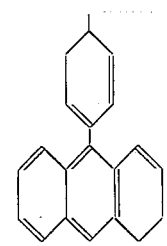

3. A brominated polymer for use in photoconductive material which is obtained by brominating a polymer selected from the group consisting of a homopolymer of 9-(p-vinylphenyl) anthracene and a copolymer of a substantial amount of 9-(p-vinylphenyl) anthracene and another polymerizable vinyl monomer, said polymer containing the following structure in its molecule:

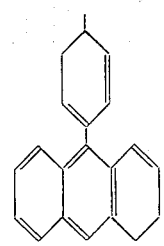

4. A process for producing a homopolymer of 9-(p-vinylphenyl)anthracene containing the following structure in its molecule:

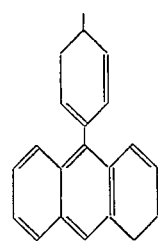

characterized in that a 9-(p-vinylphenyl)anthracene is subjected to polymerization in the presence of a suitable amount of a catalyst.

5. A process for producing a copolymer comprising 9-(p-vinylphenyl)anthracene and another polymerizable vinyl monomer and containing the following structure in its molecule:

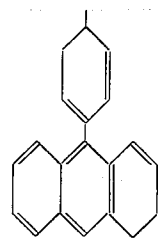

characterized in that a substantial amount of 9-(p-vinylphenyl)anthracene is co-polymerized with the vinyl monomer in the presence of a catalyst.

6. A process for producing a brominated polymer characterized in that a polymer containing the following structure in its molecule:

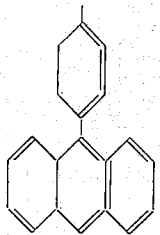

said polymer being selected from the group consisting of a homopolymer of 9-(p-vinylphenyl)anthracene and a copolymer of a substantial amount of 9-(p-vinylphenyl)anthracene and another vinyl monomer is reacted with N-bromosuccinimide in the presence of a peroxide and then the resulting brominated polymer is purified.

7. The polymer of claim 1, wherein said homopolymer has a molecular weight in the range of from 2,000 to 150,000.

8. The copolymer of claim 2, wherein said copolymer has a molecular weight in the range of from 2,000 to 150,000.

9. The copolymer of claim 2, wherein said vinyl monomer is selected from the group consisting of styrene, acrylonitrile, N-vinyl carbazole, and vinyl acetate.

10. The brominated polymer of claim 3, wherein said polymer has a molecular weight in the range of from 2,000 to 150,000.

11. The brominated polymer of claim 3, wherein said vinyl monomer is selected from the group consisting of styrene, acrylonitrile, N-vinyl carbazole, and vinyl acetate.

12. The process of claim 4, wherein said catalyst is a radical polymerization initiator and said polymerization is effected at 60° to 200°C for 2 to 40 hours to produce a homopolymer having a molecular weight in the range of from 2,000 to 150,000.

13. The process of claim 4, wherein said catalyst is a Ziegler-type catalyst and the polymerization is effected at 30 to 250°C for 10 to 100 hours to produce a homopolymer having a molecular weight in the range of from 2,000 to 150,000.

14. The process of claim 5, wherein said catalyst is a radical polymerization initiator and said polymerization is effected at 60° to 200°C for 2 to 40 hours to produce a homopolymer having a molecular weight in the range of from 2,000 to 150,000.

15. The process of claim 5, wherein said catalyst is a Ziegler-type catalyst and the polymerization is effected at 30 to 250°C for 10 to 100 hours to produce a homopolymer having a molecular weight in the range of from 2,000 to 150,000.

16. The process of claim 6, wherein said polymer as a molecular weight in the range of from 2,000 to 150,000.

17. The process of claim 6, wherein said vinyl monomer is selected from the group consisting of styrene, acrylonitrile, N-vinyl carbazole and vinyl acetate.

* * * * *